United States Patent [19]

Falcoff et al.

[11] Patent Number: 4,615,902
[45] Date of Patent: Oct. 7, 1986

[54] COLOR PANEL STANDARDS SORTING SYSTEM

[75] Inventors: Allan F. Falcoff, Lake Orion; David H. Alman, Royal Oak, both of Mich.

[73] Assignee: E. I. Du Pont de Nemours and Company, Wilmington, Del.

[21] Appl. No.: 771,687

[22] Filed: Sep. 3, 1985

[51] Int. Cl.⁴ .............................................. B05D 1/00
[52] U.S. Cl. ........................................ 427/8; 118/665;
    209/580; 209/581; 209/938
[58] Field of Search ....................... 209/580, 581, 938;
    356/405; 427/8; 118/665

[56] References Cited

U.S. PATENT DOCUMENTS

| | | | |
|---|---|---|---|
| 3,066,797 | 12/1962 | Fraenkel | 209/580 |
| 3,690,771 | 9/1972 | Armstrong, Jr. et al. | 356/176 |
| 3,916,168 | 10/1975 | McCarty | 356/405 |
| 4,157,139 | 6/1979 | Björk | 209/580 |
| 4,278,538 | 7/1981 | Lawrence | 209/581 |
| 4,479,718 | 10/1984 | Alman | 356/405 |

Primary Examiner—Shrive P. Beck
Attorney, Agent, or Firm—Hilmar L. Fricke

[57] ABSTRACT

A process for forming paint panel color standards in which a multiplicity of panels are painted and marked with a man/machine readable ID number; the improvement used with this process is as follows:

(1) electronically determining the ID number of each panel and measuring each panel color coordinate values and feeding this information to a computer which establishes a criteria for various panel quality standards;

(2) sorting the panels by electronically determining panel ID number and feeding the number to the computer which signals a robot to place the panel with a group of panels having the same quality standard.

8 Claims, 3 Drawing Figures

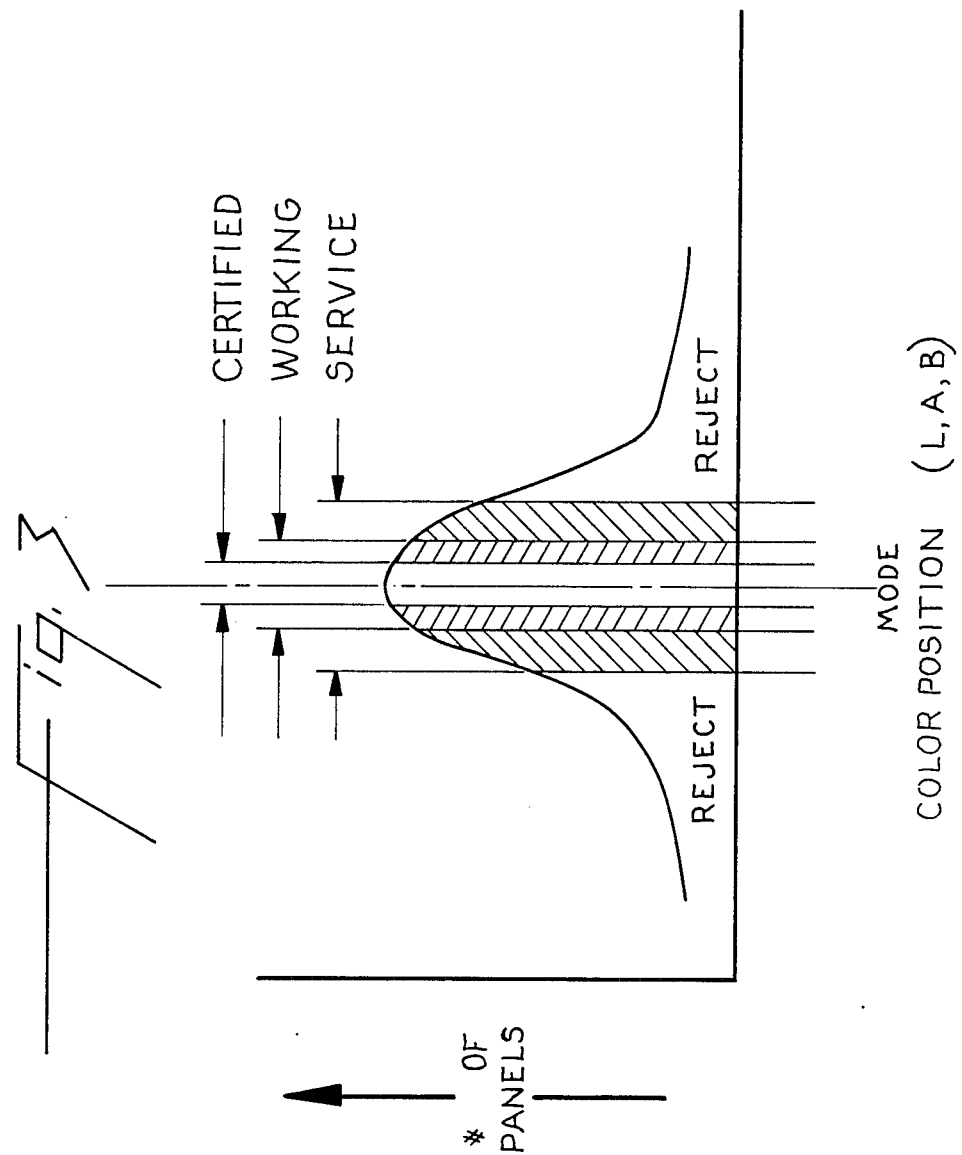

COLOR PANEL STANDARDS SORTING SYSTEM

BACKGROUND OF THE INVENTION

This invention is directed to an improved process for the preparation of paint panel color standards.

Paint panel color standards are used by auto and truck dealers for sales purpose, by assembly plants to visually compare the color of an automobile or truck that has been painted to a standard, by quality control laboratories in assembly plants to check color of incoming paints and by quality control laboratories in paint plants to check the color of manufactured paints. Large quantities of panels are used for these purposes. However, each use requires a panel with a different level of color quality.

Paint panel color standards used for sales purposes can have a greater color variation than can those panels used in an assembly plant or in a quality control laboratory. Panels used in a quality control laboratory must have very close color tolerances and can only deviate very slightly in color.

There is a need for an improved process that can color grade, classify and sort large numbers of panels rapidly and economically. The above can be accomplished with the improved process of this invention.

SUMMARY OF THE INVENTION

This is a process for forming paint panel color standards in which a multiplicity of panels are each coated with a paint and dried and each panel is marked with a separate identification (ID) number; the improvement that is used with this process is as follows:

(1) the (ID) number of each of the panels is electronically determined by a readout device and color coordinate values of each panel are measured using a color measuring instrument such as a colorimeter or spectrophotometer and an electromechanical robot for movement of panels from the readout device to color measuring instrument; the ID number and the color coordinate values for each panel, are fed to a computer which assimilates the values and establishes a criteria based on these values for various panel quality standard categories;

(2) the panels then are sorted using an electromechanical robot to move the panels to a readout device that electronically reads the panel ID number and feeds the ID number to the computer which determines the quality standard category of the panel and feeds this information to the robot which then places the panels with a group of panels that are within the same quality standard category.

BRIEF DESCRIPTION OF THE DRAWINGS

FIG. 3 shows a typical histogram for color coordinate values.

DETAILED DESCRIPTION OF THE INVENTION

Figure 1:
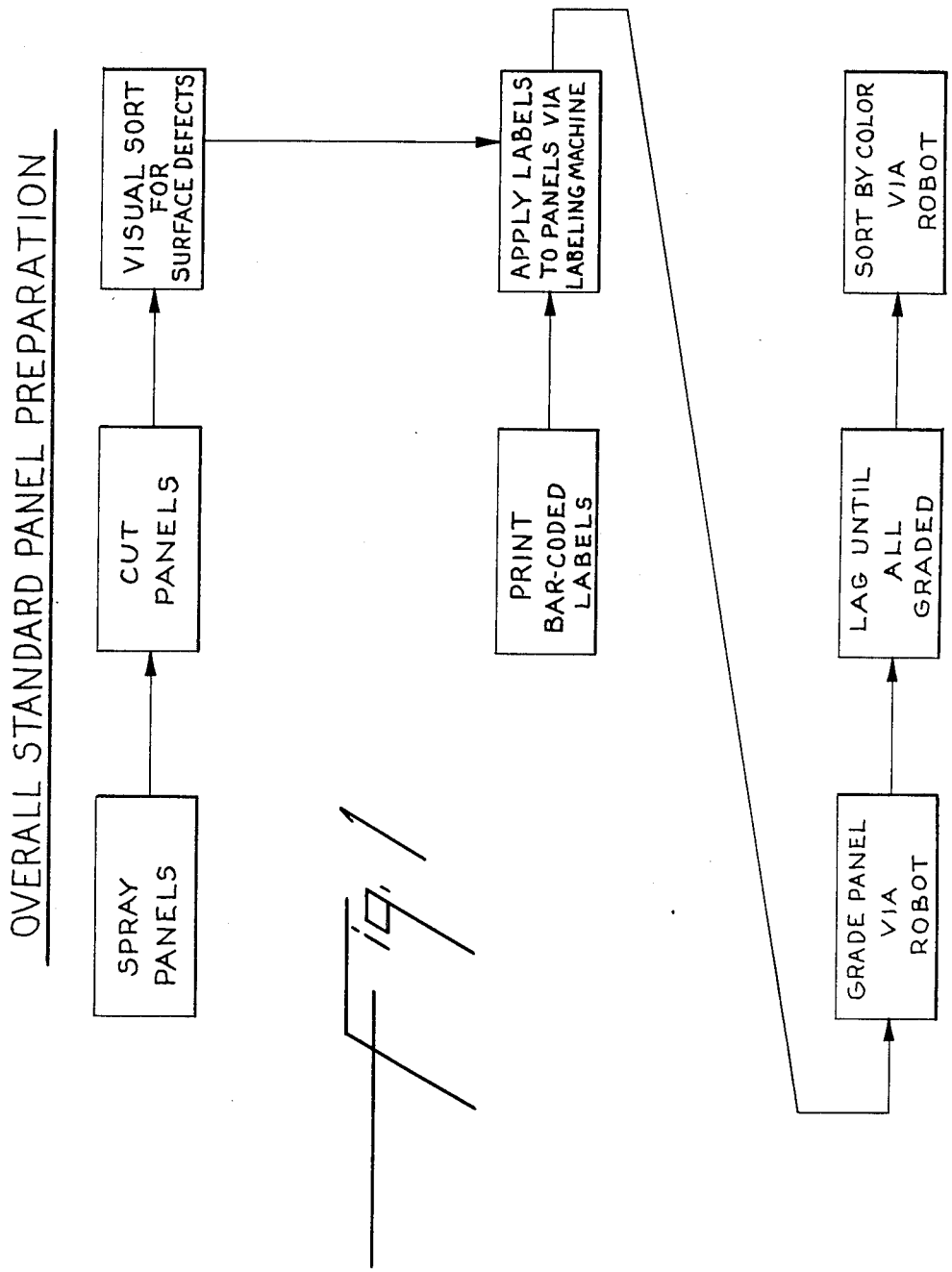
FIG. 1 shows a block diagram layout of the standard panel preparation, grading and sorting process.

In References to FIG. 1, which shows the overall panel preparation process, panels are coated usually by spraying paint on the panel and then the panels are dried generally by baking at elevated temperatures. Typically, the panels are of aluminum and are about 19×25 inches. After the panels are coated and dried, small panels about 4×6 inches are cut using a conventional stamp cutting machine. Generally, the outer edges of the large panel are removed before the panels are cut since there often is a build-up of paint on the edges.

Preferably, the panels are initially sorted for visual defects such as dirt in the paint, scratches, orange peel appearance and other surface imperfections.

Each of the panels then are labeled and given a separate man/machine readable identification (ID) number. Preferably, a label with bar code ID number is applied to the unpainted back of each panels. Usually, the panel label also has a bar code for the color. The bar code can be read by a non contacting laser bar code reader which transmits the information to a computer which stores the information along with color values that are measured later. Bar coded labels are preprinted each with a sequential unique ID number; then with a conventional labeling machine, the labels are applied to the back of the panels.

Printing equipment for the labels is a package of units that are designed to run with an IBM PC that contains a 256K memory and has two floppy disc drives. The package consists of a word processor-like, operator interactive, software computer program that accepts the data to be printed on the label and a modified Data-Products Company dot-matrix printer. The printer prints alpha numeric data and bar-code data.

The program places the data on the label in the correct format (centers, print font, print size, etc.) The operator selects the data to be bar coded on the labels and instructs the program as to the starting panel number and the print size. The software automatically increments the panel ID number on each successive label. After a label run is completed, the computer files the completed data for each label onto a disk including the last printed ID number. This insures that if the run is continued at a later time that no ID number is repeated.

A conventional labeling machine is used to apply the label to the panels. The label is a heavy paper having a pressure sensitive adhesive and is attached to a release paper. The label is applied mechanically by peeling the label from the release paper and applying it to the back of a painted aluminum panel.

A typical basic labeler and conveyer machine that can be used is manufactured by Harland Machine Systems, Ltd., Lancashire, England and is distributed in the U.S.A. by Tolas Corp., Newtown, PA. A labeler will usually handle about 1200 panels per hour. For any one color about 7000 panels are prepared, graded and sorted.

After the panels are labeled, they are then graded for color characteristics and then sorted according to quality standard categories established by a computer. In color grading of the panels, the color coordinate values are measured with a colorimeter; a spectrophotometer can also be used. This is accomplished by moving the panels with a computer controlled robot from a feed stack to the colorimeter. The colorimeter reads the color coordinate values of the panels at multiple angles and feeds these values to a master computer which assimilates the color data and establishes panel quality standard categories. After the color measurements are made. The panels are lagged until all of the panels are graded.

The master computer calculates a distribution of color values and the mode is determined i.e., the color values that most of the panels have. An operator can interact with the computer to establish quality standard categories. Then the panels are sorted according to panel quality standards categories which is accomplished via a computer controlled robot which moves the panels to a code reader and then to a stack of panels having the same panel quality standard category.

Figure 2:
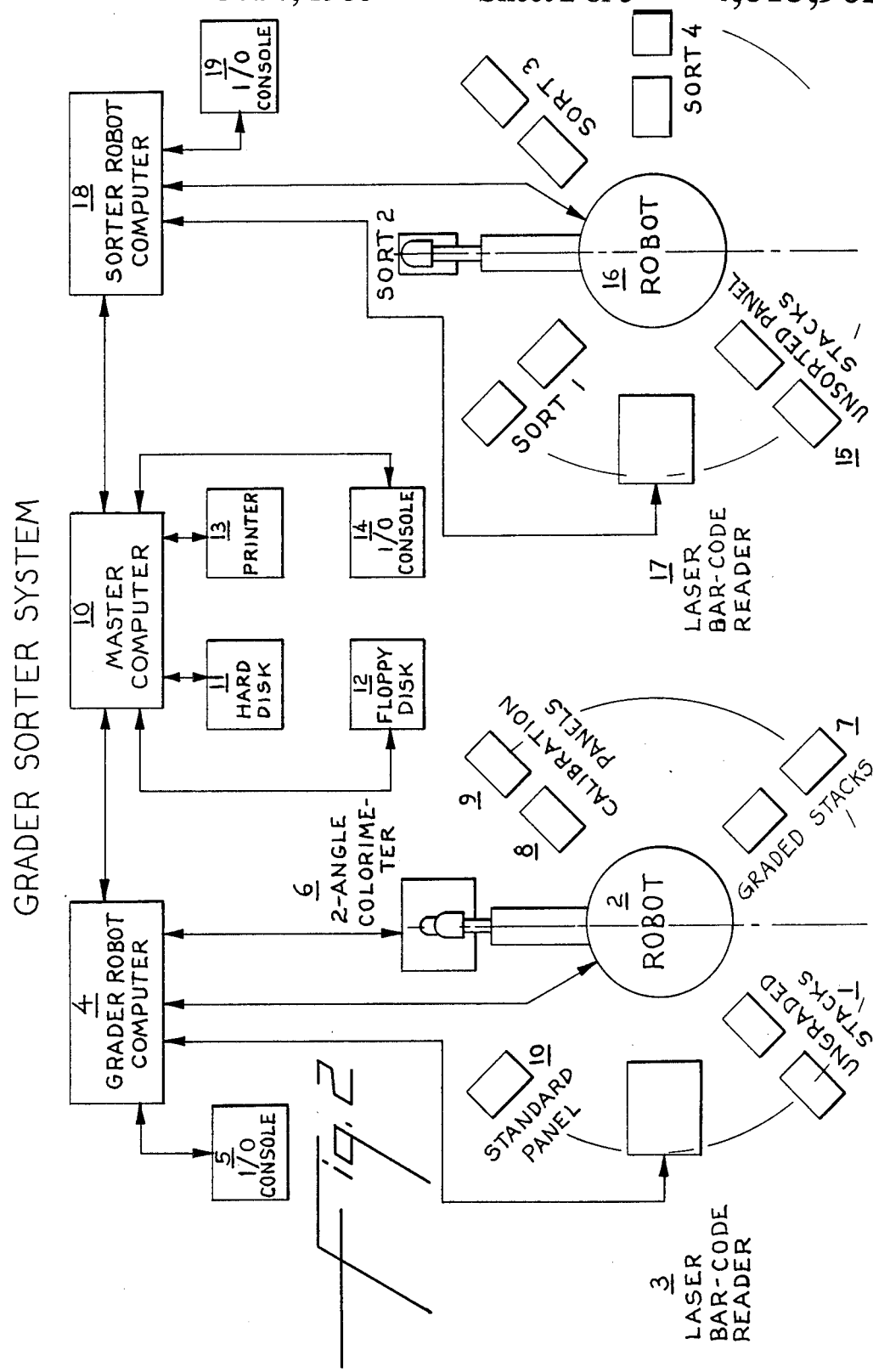
FIG. 2 shows a schematic layout of the grading and sorting process.

The grading and sorting systems are shown in more detail in FIG. 2. The labeled panels are placed in a conventional stacking device in the grader and are shown in FIG. 2 as ungraded stacks 1. A robot 2 with an arm and a suction tool picks up a panel and positions the panel under a non contacting laser bar-code reader 3 which reads the panel ID No. and feeds the information to the Grader Robot Computer 4 having an Input Output (I/O) Console 5. The robot positions the panel under a 2 angle colorimeter 6 and the colorimeter determines the L, a and b color coordinates for the panel at two different angles and this information is fed to the computer 4. The robot then places the panels on graded stacks 7.

U.S. Pat. No. 4,479,718, Alman, issued Oct. 30, 1984 discusses the measurement of L, a and b color coordinate values and the patent is hereby incorporated by reference. Also, Principles of Color Technology, 2nd Edition Billmeyer and Saltzman, John Wiley & Sons, 1981 discuss in detail L, a and b coordinate values that are used in color measurements. Other color measuring systems can also be used to establish color values and these systems are described in Billmeyer, et al. Another color measuring system is shown in Commission Internationale de L'Eclairage, *Recommendations on Uniform Color Spaces—Color Difference Equations Psychometric Color Terms,* Bureau Central de al CIE, Paris, 1978. Supplement No. 2 to CIE Publication No. 15 (E-1.31.) 1971/TC-1.3) 1978.

Before grading of the panels is started, the robot 2 calibrates the colorimeter 6 by positioning a black calibration panel 8 and a white calibration panel 9 over the colorimeter. A standard panel 10 is of the same color as the panels being measured and is placed over the colorimeter and color co-ordinates are measured. Periodically, during the panel grading process, the robot moves the standard panel over the colorimeter for a color measurement to determine whether or not the colorimeter readings are drifting excessively. If there is an excessive drift, the robot automatically recalibrates the colorimeter with the black and white panels.

In the event the bar code reader cannot read the ID number on the panel, the panel is rejected. This can occur if the panel is positioned incorrectly or placed in the stack upside down. If a panel having a completely different color is placed in the stack, it will also be rejected after the L, a, b values are measured by the colorimeter. Gross differences in these values will result in rejection of the panel.

After the color coordinates values of all the panels have been determined by the colorimeter, the values are fed to the master computer 10. The master computer is equipped with a hard disk drive 11 for storing permanent information, interim data and programs, a floppy disk drive 12 for archiving storage of information, a printer 13 and an input/output (I/O) console 14. Based on the values, the computer mathematically constructs a histogram as illustrated in FIG. 3 for each value L, a and b.

A separate histogram is determined for each of the L, a and b values and at each angle measurement is taken. With a 2 angle colorimeter 6 histograms are constructed and with a 3 angle colorimeter 9 histograms are constructed.

Generally, a mode is calculated for each histogram and given deviations from the mode are calculated that provide acceptable values for panels that qualify as certified, working and service panels. Certified panels typically, deviate within 0.12 units from the midpoint working panels typically 0.19 units from the midpoint and service panels typically 0.25 units from the midpoint. Panels having a deviation greater than 0.25 units are rejected. Adjustments can be made by an operator as needed to shift from the mode to maximize the number of useful panels and lower rejects.

Certified panels are usually used in quality control laboratories and have the smallest deviation, working panels are used in assembly plants and in paint manufacturing plants and service panels are used by dealers and salesmen for auto and truck sales.

For some colors, greater deviations for example, in an a value (redness/greeness) can be tolerated without visually noticing a color change. This greater deviation can be fed into the computer to bring more panels within the acceptable range and lessen the number of rejects or to bring more panels within the certified and working ranges. Generally, the smallest number of panels fall within the certified range and more panels within that range are often required.

After the panels have been graded, they are moved to the sorter and placed in unsorted panel stacks 15. The panels are then moved by the robot 16 to the non contact laser bar code reader 17 which reads the panel ID No. and feeds this information to the sorter robot computer 18 which inturn feeds the information to the master computer 10. The sorter computer 18 has an input/output (IO) console 19. The master computer 10 contains the grading information and has determined whether the panel is to be rejected or is a certified, working or service panel. The master computer 10 feeds a signal through the sorter computer 18 to the robot 16 which then moves the panel to the appropriate stacks shown on FIG. 2 as sort 1, 2, 3 or 4. Any number of sort stacks of panels can be designated and programmed into the robot and its computer.

Typical equipment used for the grading and sorting systems are the following:

Colorimeter 6—Two angle colorimeter model 200/AFC manufactured by Pacific Scientific Corp., Silver Spring Md. A three angle colorimeter described in U.S. Pat. No. 4,479,718, Alman can also be used.

Bar Code Reader 3 and 17—a Model 45 moving beam laser, noncontact, raster scan reader manufactured by Accu-Sort Systems, Inc., Teleford, Pa.

Robots 2 and 16—pneumatic actuated robots having four axis cylindrical coordinate motion base rotate, vertical up/down arm extend/retract, wrist rotate with a position feed back on all axis and has a feed back system controlled by software that controls deceleration and stopping of a base rotating axis. The robot is manufactured by Schader Bellows Co.

Grader and Sorter Robot Computers 4 and 18—contain Intel SBC 80/10B Single board modules, programmed in PL/M language, have a control robot and bar-code scanner to feed panel ID number to a master computer and provides for presorting of bar code data and color data and rejects invalid colors or codes.

Master Computer 10—An Intel System 310 with 10 MB hard disk, 1 floppy diskette, archives data on a magnetic tape cassette, capable of remotely displaying system operating status with a CRT, programmed in PL/M and Fortran Languages and software is run under Intel's RMX-86 operating system.

We claim:

1. An improved process for forming paint panel color standards wherein a multiplicity of panels are each coated with a paint and dried and each panel is marked with a separate identification (ID) number; the improvement used therewith comprises
   (1) electronically determining the ID number of each panel with a readout device and measuring color co-ordinate values of each panel with a color measuring instrument using an electromechanical robot to move the panel to the readout device and then to the color measuring device and feeding the ID number and color coordinate values to a computer which assimilates the values and establishes criteria based on these values for various panel quality standards categories;
   (2) sorting panels using an electromechanical robot to move the panels to a readout device that electronically reads the panel ID number and feeds the ID number to the computer which determines the quality standard category of the panel and feeds this information to the robot which then moves the panel to a groups of panels that are within the same quality standard category.

2. The process of claim 1 in which the color measuring instrument is a colorimeter or a spectrophotometer.

3. The process of claim 2 in which the colorimeter measure color coordinate values at 2 angles.

4. The process of claim 3 in which the color coordinate values are L, a and b values are measured at multiple angles.

5. The process of claim 2 in which a man/machine readable bar code is used for the ID number of each panel.

6. The process of claim 5 in which the readout device is a non contacting laser bar code reader.

7. The process of claim 2 in which the electromechanical robot through a program in the computer checks calibration and standardizes the colorimeter as required.

8. The process of claim 1 in which the electromechanical robot has pneumatic actuation, four axis cylindrical coordinate motion, is connected to and controlled by the computer and has a feed back system connected to the computer for control of actions of the robot.

* * * * *